(12) United States Patent
Kober et al.

(10) Patent No.: US 9,073,407 B2
(45) Date of Patent: Jul. 7, 2015

(54) OPERATING ELEMENT FOR AN AIR VENT

(75) Inventors: Steve Kober, Treuen (DE); Werner Lottes, Wunsiedel (DE)

(73) Assignee: TRW Automotive Electronics & Components GmbH, Radolfzell (DE)

( * ) Notice: Subject to any disclaimer, the term of this patent is extended or adjusted under 35 U.S.C. 154(b) by 360 days.

(21) Appl. No.: 13/232,008

(22) Filed: Sep. 14, 2011

(65) Prior Publication Data

US 2012/0129444 A1 May 24, 2012

(30) Foreign Application Priority Data

Oct. 7, 2010 (DE) .................. 10 2010 047 817

(51) Int. Cl.
*B60H 1/34* (2006.01)
*F24F 13/14* (2006.01)

(52) U.S. Cl.
CPC ...... *B60H 1/3414* (2013.01); *B60H 2001/3471* (2013.01); *F24F 13/1426* (2013.01)

(58) Field of Classification Search
CPC ..................... B60H 1/3414; B60H 2001/3471
USPC ......................... 454/155, 254, 315
See application file for complete search history.

(56) References Cited

U.S. PATENT DOCUMENTS

| | | | |
|---|---|---|---|
| 4,665,804 A * | 5/1987 | Miyasaka | 454/315 |
| 5,338,252 A * | 8/1994 | Bowler et al. | 454/155 |
| 5,350,555 A * | 9/1994 | Tsuda et al. | 264/242 |
| 5,364,303 A * | 11/1994 | Terry | 454/155 |
| 5,393,262 A * | 2/1995 | Hashimoto et al. | 454/155 |
| 6,080,059 A * | 6/2000 | Kim | 454/155 |
| 6,293,860 B1 * | 9/2001 | Kim | 454/155 |
| 6,589,110 B2 * | 7/2003 | Tanabe et al. | 454/155 |
| 7,162,773 B2 * | 1/2007 | Song et al. | 16/110.1 |
| 2001/0031619 A1 * | 10/2001 | Yabuya et al. | 454/155 |
| 2002/0178744 A1 * | 12/2002 | Tanabe et al. | 62/407 |
| 2004/0171344 A1 * | 9/2004 | Krause | 454/315 |
| 2006/0014485 A1 * | 1/2006 | Sousa et al. | 454/315 |
| 2007/0111653 A1 * | 5/2007 | Endou | 454/155 |
| 2009/0137200 A1 * | 5/2009 | Fujiwara | 454/254 |
| 2009/0286462 A1 * | 11/2009 | Goto | 454/155 |

FOREIGN PATENT DOCUMENTS

| | | | | |
|---|---|---|---|---|
| CN | 201368567 | | 12/2009 | |
| DE | 202006009088 | | 9/2006 | |
| GB | 2196421 A | * | 4/1988 | ............. F24F 13/15 |
| JP | 62218762 A | * | 9/1987 | ............. F24F 13/15 |

* cited by examiner

*Primary Examiner* — Alissa Tompkins
*Assistant Examiner* — Jonathan Cotov
(74) *Attorney, Agent, or Firm* — Tarolli, Sundheim, Covell & Tummino LLP

(57) ABSTRACT

The operating element (10) for an air vent includes a narrow passage (14) from a first side (16) to an opposite second side (18) for a blade (12). The passage (14) is limited at least on one side by a frame-shaped lateral portion (10) having a slit (24). At least a part (22) of the lateral portion (20) may be elastically deflected.

11 Claims, 2 Drawing Sheets

OPERATING ELEMENT FOR AN AIR VENT

FIELD OF THE INVENTION

The invention relates to an operating element for an air vent, in particular in motor vehicles.

BACKGROUND OF THE INVENTION

In prior art, various designs of operating elements for air vents are known. In may cases, these operating elements have a multi-part construction. They may be realized, for instance, in a knob-type design and comprise a separate spring element determining the force required for shifting. Operating elements for air vents, however, are already known in which the spring element is integrated in the operating element.

With such operating elements, the spring element acts on the blade usually in a direct way, whereby the spring element has to withstand a correspondingly high load when a higher shifting force of the operating element is required. With high temperatures, this may result in a creeping behavior of the material whereby the operating forces are correspondingly reduced over the useful life. This has a negative effect on a sensitive adjustment.

Basically, such operating elements are expensive to manufacture in particular if the spring element has to be invisible for the operating person.

SUMMARY OF THE INVENTION

Therefore, it is the object of the invention to provide an operating element with an integrated spring element, in which the spring element has to be preferably invisible for the operating person, the operating element may be produced in a simple and cost-effective way, and the shifting forces of the operating element remain constant over the useful life.

This object is achieved with an operating element comprising the features of claim 1 as well as with an assembly made up of a blade and an operating element comprising the features of claim 8. Advantageous and expedient configurations of the operating element according to the invention and the assembly according to the invention are indicated in the associated sub-claims.

The operating element, according to the invention, for an air vent comprises a narrow passage from a first side to an opposite second side for a blade. The passage is limited at least on one side by a frame-shaped lateral portion comprising a slit. At least a part of the lateral portion may be deflected elastically.

With the operating element construction according to the invention, a spring force acts on the blade with a suitable design due to the elastic deflection of the lateral portion when the operating element has been slipped on the blade (a usual assembly step) without the need of a spring as a separate component. The operating element is held on the blade by the spring force and reliably maintains a desired position on the blade even in case of vibrations. As the operating element has no separate spring element, its visual appearance is advantageously not impaired by such element. In case the slit in the operating element is arranged on the side facing away from the operating person, the slit is invisible for the operator. Basically, the slit may also be arranged on the side facing the operator.

In a preferred embodiment of the operating element according to the invention, the slit in the frame-shaped lateral portion extends transverse to the longitudinal direction of the blade and parallel to the blade's plane. This type of arrangement provides for an optimum orientation of the holding forces which allow shifting the operating element on the blade in its longitudinal direction in a controlled manner. Excessively high shifting forces which occur in a possible tilting situation or when the operating element is not accurately guided on the blade can be compensated for by the slit.

The inner contour of the operating element preferably has a profile which is adapted to the outer contour of the blade and comprises at least one protuberance or depression. As the operating element is intended for a blade, it is of advantage that the respective inner and outer contours are matched with each other. Compared to absolutely flat surfaces, a profile comprising at least one protuberance or depression has the advantage that the operating element may be guided on the blade.

According to a particular aspect of the invention, the inner contour of the operating element comprises a groove or a wedge-shaped protrusion along the passage in passage direction. This defined geometry allows an optimum guidance of the operating element on a blade with a corresponding construction. Basically, however, other geometries of the inner contour of the operating element and the outer contour of the blade are also conceivable. The important point is that the inner contour of the operating element is matched with the outer contour of the blade.

In a particularly preferred embodiment, the groove and the wedge-shaped protrusion comprise opposing, inclined side walls defining an inclination angle <90°. The prestressing force acting on the side walls may be adjusted by the size of the inclination angle. This prestressing force increases with decreasing inclination so that, with a corresponding construction, only a very small elastic deflection of the lateral portion is required for the prestressing force demanded as a whole. This means an effective counteraction to the creeping behavior of the plastic. Moreover, inclined side walls offer the advantage of a simplified, self-adjusting assembly of the operating element on the blade, and they provide for securing the operating element on the blade transverse to its longitudinal direction. The inclination angles of the side walls in one operating element may be equal or of differing dimension.

A groove or a wedge-shaped protrusion with an essentially trapezoidal cross-section has turned out to be favorable. The flat portion contributes to the stability of the connection between the operating element and the blade, as a support surface is made available instead of a line, having also a favorable effect in terms of wear.

It is of further advantage if the operating element is made in one piece of plastics. The reduced number of parts has a favorable effect on the logistics and the assembly, whereby the corresponding costs and the expenditure in time may be reduced. In addition, the operating element may be produced from plastics in a low-cost injection molding process offering much freedom in terms of shaping.

Moreover, the invention provides an assembly made up of a blade and an operating element, according to the invention, for an air vent.

According to a preferred embodiment of the assembly according to the invention, the inner contour of the operating element has a profile with at least one protuberance or depression, and the outer contour of the blade has a profile with a depression or protuberance adapted thereto, respectively, so that the protuberance projects into the depression. Due to the fact that the operating element and the blade comprise interlocking contours, optimum guidance and trouble-free shifting of the operating element on the blade is ensured. Here, it does not matter on which of the components the groove is arranged and on which one the wedge-shaped protrusion is disposed.

It is preferred that the contours are formed such that a wedge-shaped protrusion extending along the passage of the operating element in passage direction engages a groove extending along the blade in the longitudinal direction of the blade, or a wedge-shaped protrusion extending along the blade in the longitudinal direction of the blade engages a groove extending along the passage of the operating element in passage direction.

Advantageously, the outer contour of the blade is manufactured with oversize compared to the inner contour of the operating element. This measure results in a desired friction between the operating element and the blade. In this way, it is possible to have a selected influence on the shifting force required for moving the operating element on the blade. This results in the forces required for shifting the operating element remaining almost constant over the useful life and not diminishing. What is more, a desired position of the operating element on the blade is stably maintained and does not alter already in the event of slight vibrations which may occur in a vehicle environment as expected.

It is particularly favorable if the operating element is arranged on the blade so as to be stationary in both directions transverse to the longitudinal direction of the blade and so as to be movable in a guided manner in the longitudinal direction of the blade. This arrangement imparts high stability on the assembly made up of operating element and blade. The operating element can not slip on the blade and the operating element may be adjusted in a sensitive manner.

Further features and advantages of the invention will be apparent from the following description and the attached drawings to which reference is made and in which:

DESCRIPTION OF THE EXEMPLARY EMBODIMENTS

Figure 1:
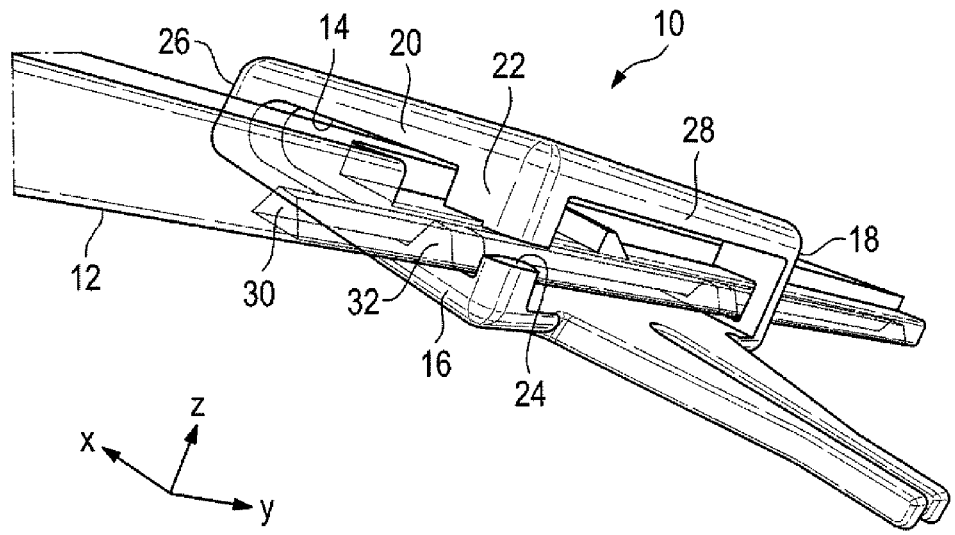
FIG. 1 is a perspective rear view of an operating element according to the invention, comprising a blade shown in transparent illustration.

FIG. 1 illustrates an operating element 10 completely made from plastics and intended for an air vent; the operating element is arranged on a blade 12. The operating element 10 comprises a narrow passage 14 from a first side 16 to an opposite, second side 18. The passage 14 is limited at least on one side by a frame-shaped lateral portion 20.

A slit 24 is formed in a part 22 of the lateral portion 20. The slit 24 extends transverse to the longitudinal direction y of the blade and parallel to the blade's plane defined by the directions x and y. The operating element 10 has an almost cuboid design comprising a closed front side 26 facing the operating person and an open rear side 28 facing away from the operating person, with the height (in direction z) of the operating element 10 increasing towards the rear side 28. The terms "front side" and "rear side" are not to be understood in a limiting sense, of course.

The outer contour of the blade 12 comprises a depression in the form of a groove 30 extending in the longitudinal direction y thereof. The groove 30 is engaged by at least one protuberance in the form of a wedge-like protrusion 32 which is a part of the inner contour of the operating element 10 and extends at least in part along the passage 14 in its passage direction y. An inverse arrangement of the groove 30 and the wedge-shaped protrusion 32 is also possible, i.e. the groove 30 may also be a part of the inner contour of the operating element 10, and the wedge-shaped protrusion 32 may protrude from the blade 12.

Figure 2:
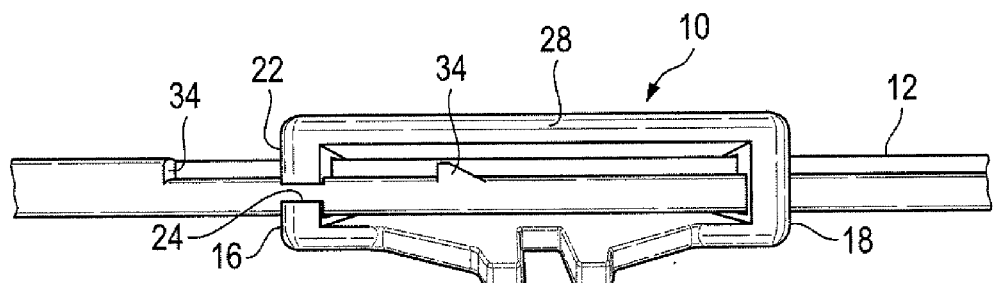
FIG. 2 is a rear view of the operating element with the blade extending transverse to the passage direction.

As can be seen in FIG. 2, stopper means 34 are formed on the blade 12, which delimit the travel of the operating element 10 in direction y by serving as stops for the frame-shaped lateral portion 20. The blade 12 projects right through the operating element 10 from the first side 16 to the second side 18.

Figure 3:
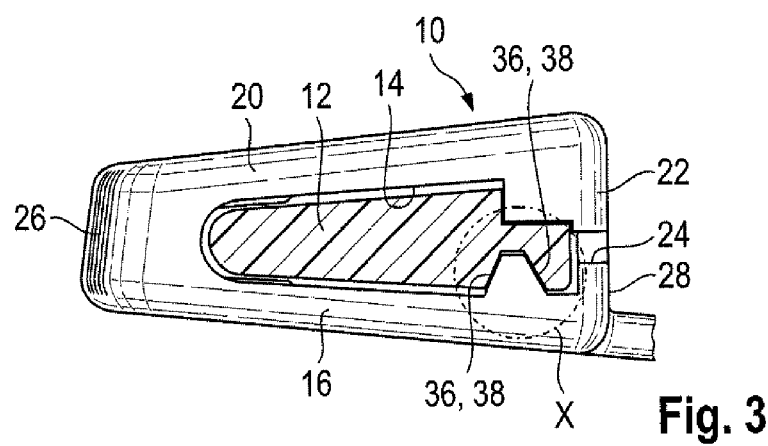
FIG. 3 is a side view of the operating element with the blade shown in cross-section.

FIG. 3 shows the inner contour of the operating element 10 and the outer contour (illustrated in cross-section) of the blade 12. The frame-shaped lateral portion 20 delimits the narrow passage 14 of the operating element 10. The slit 24 extending transverse to the longitudinal direction y of the blade and parallel to the blade's plane allows an elastic deflection at least of the part 22 of the frame-shaped lateral portion 20 in direction z. In addition, one can see how the wedge-shaped protrusion 32 of the operating element 10 engages the groove 30 of the blade 12. Both the groove 30 and the wedge-shaped protrusion 32 have an essentially trapezoidal cross-section with opposing, inclined side walls 36 and 38.

The operating element 10 is slipped onto the blade 12 and is capable of being moved thereon in the longitudinal direction y of the blade. The movement is guided by the wedge/groove construction described above. Due to the fact that the outer contour of the blade 12 is manufactured with oversize related to the inner contour of the operating element 10 and the slit 24 allows an elastic deflection of the frame-shaped lateral portion 20, a prestressing force acts between the operating element 10 and the blade 12 which is achieved without using any additional spring element. The force acting in direction z, i.e. perpendicular to the blade's plane, retains the operating element on the blade 12 so that a desired position of the operating element 10 on the blade 12 may be stably adjusted and this position is reliably maintained, too.

Figure 4:
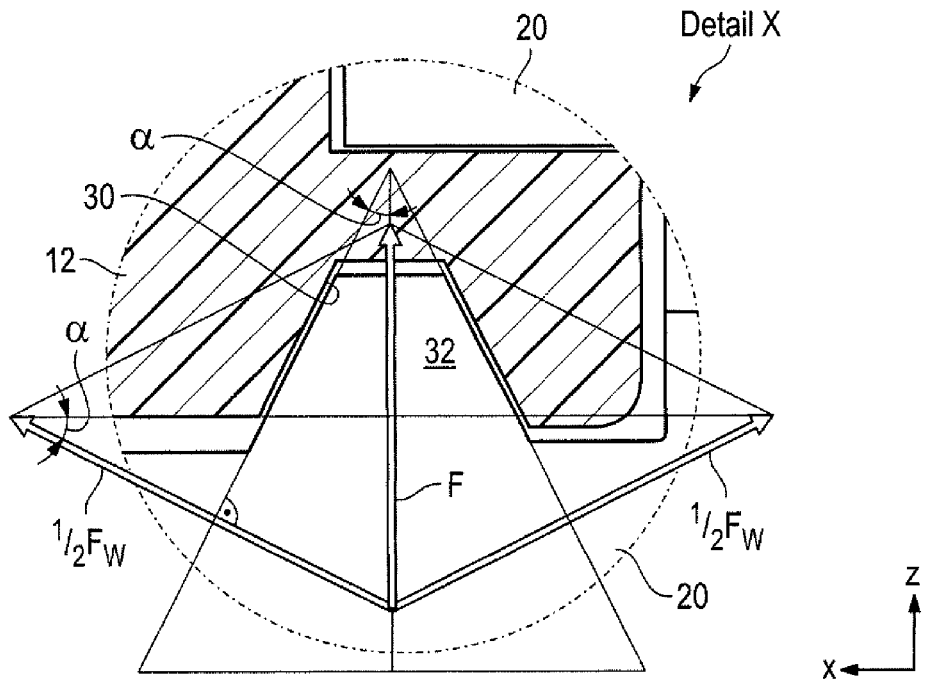
FIG. 4 shows an enlargement of detail X of FIG. 3.

The enlarged illustration of FIG. 4 clearly shows the way how the components ½ $F_w$ of the prestressing force F act on the side walls 36, 38 of the groove 30 or of the wedge-shaped protrusion 32 depending on the inclination. Thus, it is possible to adjust the force components, acting on the side walls 36, 38 and determining the resistance of the operating element 10 on the blade 12 or the shifting force to be applied for the shifting process, via the inclination angle α. The inclination angle α is the acute angle (<90°) between the direction z and the side walls 36, 38.

Figure 5:
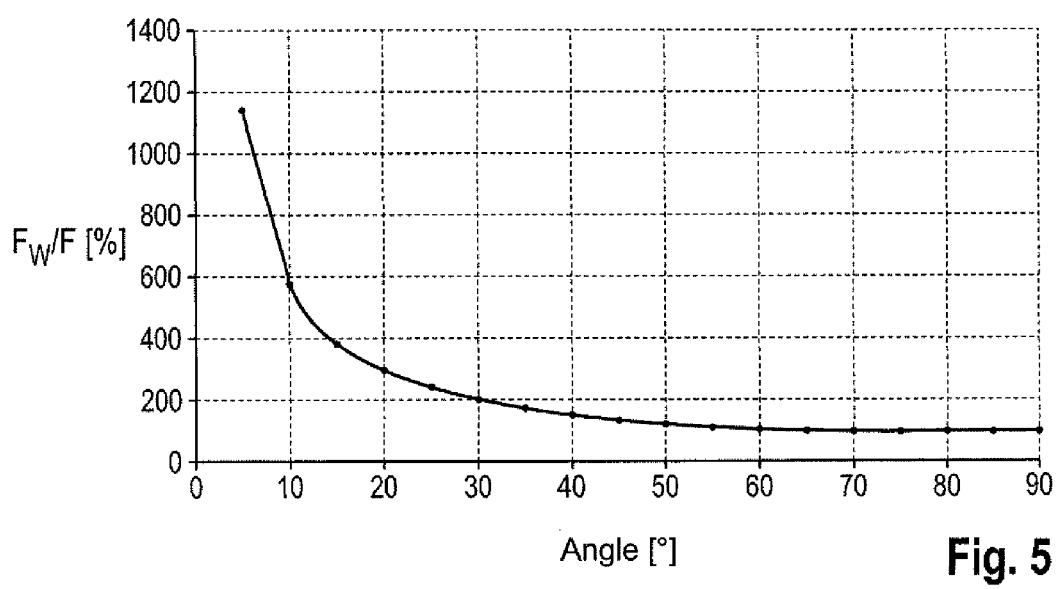
FIG. 5 shows a diagram of the prestressing force as a function of the inclination angle.

For the embodiment shown in FIGS. 1 to 4, the diagram in FIG. 5 shows the percentage of the two force components with respect to the prestressing force Fw/F acting perpendicular to the blade as a function of the inclination angle α. The smaller the inclination angle α, the larger the force components acting on the side walls 36, 38. A reverse arrangement of groove 30 and wedge-shaped protrusion 32 will also result in a comparable diagram.

The inclination angles α of the individual side walls 36, 38 may be identical or at least partially differ from each other.

Further stabilization of the arrangement of the operating element 10 and the blade 12 is achieved in that the groove 30 and the wedge-shaped protrusion 32 have a trapezoidal cross-section resulting in an extended contact area as a whole. This geometry enlarges the frictional forces between the moved parts, too.

Due to the geometry described above, the operating element 10 may be moved on the blade only in the longitudinal direction y of the blade, but not transverse thereto in the two other directions in space x and z.

LIST OF REFERENCE NUMERALS 10 operating element
12 blade
14 passage
16 first side
18 second side
20 frame-shaped lateral portion
22 part of the lateral portion
24 slit
26 front side
28 rear side
30 groove
32 wedge-shaped protrusion
34 stop elements
36 side walls of the groove
36 side walls of the wedge-shaped protrusion

The invention claimed is:

1. An operating element (10) for an air vent, comprising a narrow passage (14) from a first side (16) to an opposite second side (18) for a blade (12), the blade having a longitudinal direction and a transverse direction that define a plane, the passage extending through the operating element in the longitudinal direction of the blade, the passage (14) being limited on both sides by frame-shaped lateral portions (20) spaced from each other in the longitudinal direction of the blade, at least one of the frame-shaped lateral portions (20), at a rear side (28) of the operating element (10), fully extending across the blade (12) inserted in the passage (14) in a direction substantially perpendicular to the plane, at least one of the frame-shaped lateral portions (20) comprising a slit (24) so that at least a part (22) of the lateral portion (20) may be deflected elastically wherein the slit (24) in the frame-shaped lateral portion (20) extends transverse to the longitudinal direction of the blade and parallel to the blade's plane.

2. The operating element (10) for an air vent according to claim 1, wherein the inner contour of the operating element (10) has a profile which is adapted to the outer contour of the blade (12) and comprises at least one protuberance or depression.

3. The operating element (10) for an air vent according to claim 2, wherein the inner contour of the operating element (10) comprises a groove (30) or a wedge-shaped protrusion (32) along the passage (14) in passage direction.

4. The operating element (10) for an air vent according to claim 3, wherein the groove (30) or the wedge-shaped protrusion (32) comprise opposing, inclined side walls (36, 38) defining an inclination angle <90°.

5. The operating element (10) for an air vent according to claim 3, wherein the groove (30) or the wedge-shaped protrusion (30) has a generally trapezoidal cross-section.

6. The operating element (10) for an air vent according to claim 1, wherein the operating element (10) is made in one piece of plastics.

7. An assembly comprising a blade (12) and an operating element (10) for an air vent according to claim 1, wherein the inner contour of the operating element (10) has a profile with at least one protuberance or depression and the outer contour of the blade (12) has a profile with a depression or protuberance adapted thereto, respectively, so that the protuberance projects into the depression.

8. The assembly according to claim 7, wherein a wedge-shaped protrusion (32) extending along the passage (14) of the operating element (10) in passage direction engages a groove (30) extending along the blade (12) in the longitudinal direction of the blade, or a wedge-shaped protrusion (32) extending along the blade (12) in the longitudinal direction of the blade engages a groove (30) extending along the passage (14) of the operating element (10) in passage direction.

9. The assembly according to claim 7, wherein the outer contour of the blade (12) is manufactured with oversize compared to the inner contour of the operating element (10) such that the blade (12) engages the operating element (10) to provide a friction force therebetween.

10. The assembly according to claim 7, wherein the operating element is arranged on the blade (12) so as to be stationary in both directions transverse to the longitudinal direction of the blade and so as to be movable in a guided manner in the longitudinal direction of the blade.

11. An operating element for an air vent, comprising:
a passage extending in a first direction from a first side of the operating element to an opposite second side of the operating element for receiving a blade of the air vent, the blade having a longitudinal direction and a transverse direction that define a plane, the passage extending through the operating element in the longitudinal direction of the blade;
a first frame-shaped lateral portion on the first side having an upper portion engagable with an upper surface of the blade, a lower portion engagable with a lower surface of the blade, and a part extending from the upper portion to the lower portion at a rear side of the operating element in a direction substantially perpendicular to the plane; and
a second frame-shaped lateral portion on the opposite second side having a slit allowing elastic deflection of a part of the second frame-shaped lateral portion, the second frame-shaped lateral portion being spaced from the first frame-shaped lateral portion in the longitudinal direction of the blade.

\* \* \* \* \*